United States Patent
Manchanda et al.

(10) Patent No.: US 9,750,047 B1
(45) Date of Patent: Aug. 29, 2017

(54) CONTROL OF INITIAL UPLINK GRANT BASED ON RANDOM ACCESS REQUEST INDICATING PLANNED INITIATION OF PACKET-BASED REAL-TIME MEDIA SESSION

(71) Applicant: Sprint Spectrum L.P., Overland Park, KS (US)

(72) Inventors: Nitesh Manchanda, Overland Park, KS (US); Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 102 days.

(21) Appl. No.: 14/843,592

(22) Filed: Sep. 2, 2015

(51) Int. Cl.
| | |
|---|---|
| *H04B 7/00* | (2006.01) |
| *H04W 72/14* | (2009.01) |
| *H04M 15/00* | (2006.01) |
| *H04W 76/04* | (2009.01) |
| *H04W 76/02* | (2009.01) |
| *H04W 74/08* | (2009.01) |
| *H04W 4/16* | (2009.01) |

(Continued)

(52) U.S. Cl.
CPC ........... *H04W 72/14* (2013.01); *H04M 15/56* (2013.01); *H04M 15/59* (2013.01); *H04W 4/16* (2013.01); *H04W 74/0833* (2013.01); *H04W 76/022* (2013.01); *H04W 76/046* (2013.01); *H04W 88/02* (2013.01); *H04W 88/08* (2013.01); *H04W 92/10* (2013.01)

(58) Field of Classification Search
CPC ......... H04W 28/0215; H04W 28/0273; H04W 28/16; H04W 28/18; H04W 28/26
USPC ......................... 370/310, 328, 329, 341, 348
See application file for complete search history.

(56) References Cited

U.S. PATENT DOCUMENTS

| | | | | |
|---|---|---|---|---|
| 6,438,114 B1 * | 8/2002 | Womack | ........... | H04W 72/0413 370/329 |
| 7,289,816 B2 * | 10/2007 | Mills | ................... | H04W 76/005 370/352 |

(Continued)

OTHER PUBLICATIONS

"3Gpp Long Term Evolution (LTE): Random Access procedure in LTE," http://4g-lte-world.blogspot.com/2013/04/random-access-procedure-rack-in-lte.html, Apr. 29, 2013.

(Continued)

*Primary Examiner* — Dmitry H Levitan

(57) ABSTRACT

Disclosed is a method and system that may help to expedite initiation of a packet-based real-time media session such as a VoIP session. Per the disclosure, the initial uplink grant that a base station provides to a UE in response to an access request may be an extent of uplink resources sufficient to carry just a radio-link-layer connection request. But when a UE is going to initiate a packet-based real-time media session, the UE may send a particular type of access request that is indicative of the plan to initiate a packet-based real-time media session, and responsive to the access request being of that particular type, the base station may then instead provide an initial grant of a greater extent of uplink resources sufficient to carry from the UE not only the radio-link-layer connection request but also a session initiation request (e.g., SIP INVITE) for the packet-based real-time media session.

20 Claims, 4 Drawing Sheets

(51) Int. Cl.
    *H04W 88/02*     (2009.01)
    *H04W 88/08*     (2009.01)
    *H04W 92/10*     (2009.01)

(56) References Cited

U.S. PATENT DOCUMENTS

| | | | |
|---|---|---|---|
| 9,426,828 B1* | 8/2016 | Singh | H04W 74/0833 |
| 2009/0042582 A1 | 2/2009 | Wang | |
| 2011/0116364 A1 | 5/2011 | Zhang et al. | |
| 2012/0033613 A1 | 2/2012 | Lin et al. | |
| 2012/0077507 A1* | 3/2012 | Lee | H04W 74/006 |
| | | | 455/450 |
| 2015/0304937 A1* | 10/2015 | Kim | H04W 48/14 |
| | | | 370/230 |

OTHER PUBLICATIONS

ShareTechnote, "RACH," http://www.sharetechnote.com/html/RACH_LTE.html, printed from the World Wide Web Jun. 12, 2014.
Tayal, "Random Access Procedure (RACH) I Tayal's way to learn LTE," http://nitintayla-lte-tutorials.blogspot.com/2013/09/random-access-procedure-rach.html, Sep. 19, 2013.
U.S. Appl. No. 14/303,097, filed Jun. 12, 2014.
LTE; Evolved Universal Terrestrial Radio Access (E-UTRA); Medium Access Control (MAC) protocol specification (3GPP TS 36.321 version 8.6.0 Release 8), Technical Specification, ETSI TS 136 321 V8.6.0 (Jul. 2009).
Pre-interview communication, in U.S. Appl. No. 14/303,097, dated Oct. 6, 2015.

* cited by examiner

CONTROL OF INITIAL UPLINK GRANT BASED ON RANDOM ACCESS REQUEST INDICATING PLANNED INITIATION OF PACKET-BASED REAL-TIME MEDIA SESSION

BACKGROUND

Unless otherwise indicated herein, the description provided in this this section is not itself prior art to the claims and is not admitted to be prior art by inclusion in this section.

A typical cellular wireless network includes a number of base stations each radiating to define a respective coverage area in which user equipment devices (UEs) such as cell phones, tablet computers, tracking devices, embedded wireless modules, and other wirelessly equipped communication devices (whether or not technically "user" operated), can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol or "radio access technology," with communications from a base station to UEs defining a downlink or forward link and communications from UEs to the base station defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1×RTT and 1×EV-DO), Wireless Interoperability for Microwave Access (WiMAX), and Global System for Mobile Communications (GSM), among others. Each protocol may define its own procedures for registration of mobile terminals, initiation of communications, handover between coverage areas, and other functions related to air interface communication.

In accordance with the air interface protocol, each coverage area may operate on one or more carrier frequencies or range of carrier frequencies. Further, each coverage area may define a number of channels or specific resources for carrying signals and information between the base station and mobile terminals. For instance, certain resources on the downlink may be reserved to carry a pilot or reference signal that UEs may detect as an indication of coverage and may measure to evaluate coverage quality. Further, certain resources on the uplink may be reserved to carry access requests from UEs seeking to connect with the base station. And certain resources on the downlink may be reserved to carry control messaging such as paging messages and access response messages from the base station. In addition, certain resources on the uplink and downlink may be set aside to define shared channels for carrying bearer traffic and other communications, with the base station scheduling use of those shared channel resources on an as-needed basis.

When a UE enters into coverage of a base station, the UE may engage in a process to establish a radio-link-layer connection with the base station. This process may take various forms, depending on the air interface protocol. By way of example, once the UE detects coverage of the base station, the UE may send to the base station an access request message such as a randomly selected access code, and the base station may then send an access response message that provides an allocation of uplink shared channel resources on which the UE can request a radio-link-layer connection. The UE may then transmit on the allocated uplink resources a request to establish a radio-link-layer connection and may include in that request an identification of the UE. And in response, the base station may grant the UE's request to establish the radio-link-layer connection and may store a record indicating the existence and identity of the radio-link-layer connection.

Further, as part of this process or subsequently (e.g., via the radio-link-layer connection), the UE may register or attach with the base station so as to trigger setup of various records and connections in the network for the UE. By way of example, the UE may send to the base station an attach request, which the base station may forward to a control entity such as a mobility management entity or the like. After the network engages in a process of authenticating the UE, the control entity may then engage in signaling to set up one or more bearer tunnels ("bearers") for the UE between the base station and a gateway system that provides connectivity with a transport network such as the Internet, the gateway system may assign an Internet Protocol address to the UE, and the base station may maintain a context record associating each such bearer with the UE's radio-link-layer connection. In practice, for instance, the control entity may work to set up various types of bearers for the UE based on a service profile record for the UE, with each bearer possibly having a different respective quality of service. For example, the control entity may set up a default best-efforts bearer for general data communication, and the control entity may set up a higher quality bearer for carrying certain types of session setup signaling or the like. Other examples are possible as well.

Once the UE has a radio-link-layer connection with the base station and has one or more established bearers, the base station may then schedule air interface communications to and from the UE. For instance, when the gateway system receives data destined to the UE, the gateway system may forward the data to the base station, the base station may then select particular downlink shared channel resources on which to transmit the data to the UE, and the base station may (i) transmit on a downlink control channel to the UE a scheduling directive designating the selected resources and (ii) transmit the data to the UE on the designated resources. Similarly, when the UE has data to transmit onto the Internet, the UE may transmit a scheduling request on an uplink control channel to the base station, and the base station may then select particular uplink shared channel resources on which the UE can transmit the data and may transmit to the UE on a downlink control channel a scheduling directive designating the selected resources. In turn, the UE may then transmit the data on the designated resources to the base station, and the base station may forward the data via a bearer established for the UE to the gateway system for transmission onto the Internet.

In addition, in this or other arrangements, when no data has flowed to or from a UE for a threshold period of time, the network may be arranged to automatically release the UE's established radio-link-layer connection and perhaps one or more bearers for the UE between the base station and the gateway system, while maintaining at least some network records and/or connections for the UE. At that point, the UE may then be considered to be in an "idle" or "dormant" state, in which the UE does not have a radio-link-layer connection with the base station. In that state, if the gateway system has data to transmit to the UE or if the UE has data to transmit to the gateway system, the UE may need to engage in an access and connection process similar to or the same as that described above, to acquire a radio-link-layer connection over which the data can flow, transitioning the UE back to a "connected" or "active" state. In practice, for instance, if the gateway system has data to transmit to an idle UE, the gateway system may signal to the control entity, and the control entity may responsively cause the base station to page the UE, in response to which the UE may engage in the access and connection process to transition to a connected state. Likewise, if an idle UE itself has data to transmit, the UE may responsively engage in the access and connection process to transition to a connected state. And the base station may then schedule the communication in the manner noted above.

OVERVIEW

A process like that described above may work well generally. For instance, when a UE is in the idle state and seeks to transmit data, the UE may simply engage in an access and connection process as described above and then work with the base station so as to transmit the data on scheduled uplink shared channel resources.

A problem can arise, however, where an idle UE seeks to very quickly transmit data. In that situation, the access and connection process may take some time to complete and may therefore unacceptably delay the actual data transmission. A good example of this is where an idle UE will seek to initiate a packet-based real-time media session such as a voice over Internet Protocol (VoIP) call, a video call, a push-to-talk session, or the like, which a user of the UE may wish to happen very quickly.

To initiate such a session with a remote party, the UE may need to first transmit some session setup signaling data, in accordance with a protocol such as the well-known Session Initiation Protocol (SIP). In practice, for instance, the UE may need to first transmit to a media server a SIP INVITE message designating the UE's desire to establish a packet-based real-time media session with a particular other party, the UE may then receive in response from the media server a SIP 200 OK message accepting the initiation request, and the UE may then transmit a SIP ACK to compete the session setup. (Other intervening or alternative SIP messages, or messages using a different session initiation protocol, could be used as well.) With the packet-based real-time media session thus established, the UE may then engage in the session.

In order for the idle UE to be able to send a SIP INVITE or the like so as to initiate setup of a packet-based real-time media session, however, the UE may need to first acquire a radio-link-layer connection with the base station (transitioning to the connected state), so that the base station can schedule uplink transmission of the SIP INVITE from the UE. Yet the access and connection process for acquiring that radio-link-layer connection may take an undesirable amount of time when a user is seeking to place a voice call or is otherwise seeking to initiate a packet-based real-time media session.

Disclosed herein is a method and system that may help expedite initiation of a packet-based real-time media session. In accordance with the disclosure, the initial uplink grant that the base station provides to a UE in response to an access request may be an extent of uplink resources sufficient to carry just a radio-link-layer connection request (perhaps with associated signaling or parameters). But when a UE is going to initiate a packet-based real-time media session, the UE may send a particular type of access request that is indicative of the plan to initiate a packet-based real-time media session, and in response to the access request being of that particular type, the base station may then instead provide an initial grant of a greater extent of uplink resources sufficient to carry from the UE not only the radio-link-layer connection request but also a session initiation request (e.g., SIP INVITE) for the packet-based real-time media session.

Thus, per the disclosure, the UE may then transmit to the base station, on the uplink resources allocated by the initial grant, both the radio-link-layer connection request and the session initiation request, without waiting to acquire a radio-link-layer connection before transmitting the session initiation request. Further, the base station may then store the UE's session initiation request while the base station awaits re-establishment of one or more network connections (e.g., a bearer from the base station to the gateway system) over which to transmit the session initiation request. And upon setup of such connection(s), the base station may then forward the session initiation request to the gateway system for transmission to a destination media server or the like.

Accordingly, in one respect, disclosed is a method operable by a base station. The base station is configured to engage in an access process in response to the base station wirelessly receiving a random access request from a UE without an identification of the UE, where the access process includes the base station transmitting, for receipt by the UE that sent the access request, an access response that provides the UE with an initial grant of air interface resources for carrying a radio resource control (RRC) connection request from the UE to the base station.

Per the disclosure, the base station makes a determination, based at least in part on the received random access request, of whether the random access request is of a particular type, where the particular type indicates the UE will seek to initiate a packet-based real-time media session. Further, based at least in part on that determination, the base station then determines an extent of air interface resources to specify as the initial grant. In particular, if the determination is that the random access request is of the particular type, then, based on the determination, the base station determines as the extent a first extent sufficient to carry both the RRC connection request and a session initiation request for the packet-based real-time media session. Whereas, if the determination is that the access request is not of the particular type, then the base station determines as the extent a second, lesser extent sufficient to carry the RRC connection request but not sufficient to additionally carry the session initiation request. In turn, the base station then structures the initial grant in accordance with the determination, such as by specifying in the initial grant the allocated resources.

In turn, the method may then involve the base station receiving a transmission from the UE on the air interface resources specified by the initial grant. And if the determined extent was the first extent, the transmission would include the RRC connection request and the session initiation request, and the method would further include (i) the base station storing the received session initiation request until a bearer tunnel for carrying the session initiation request is established for the UE from the base station to a gateway system, and (ii) upon establishment of the bearer tunnel, the base station transmitting the session initiation request via the bearer tunnel to facilitate initiation of the packet-based real-time media session. Whereas, if the determined extent was the second extent, then the transmission would include the RRC connection request but not the session initiation request. Further, the method may also involve the base station sending to the UE a response to the RRC connection request.

In another respect, disclosed is also a method operable by a UE. Per the disclosure, when a UE is operating in an RRC idle mode in coverage of a base station and seeks to initiate in a VoIP call, the UE transmits to the base station a random access request of a particular type, the particular type indicating that the UE will initiate a VoIP call. In turn, the UE then receives from the base station, in response to the random access request of the particular type, an initial uplink grant of air interface resources for carrying from the UE both an RRC connection request and a session initiation request for the VoIP call. And the UE then transmits concurrently on the air interface resources of the initial uplink grant both the RRC connection request and the session initiation request for the VoIP call.

Still further, disclosed is a base station operable to carry out various features described herein. Per the disclosure, the base station includes a wireless communication interface having an antenna structure for wirelessly transmitting and receiving over an air interface, the air interface defining a random access channel for carrying random access messages wirelessly from UEs to the base station. Further, the base station includes a controller (e.g., a programmed processing unit) that is configured to carry out various operations. By way of example, the controller is configured to detect receipt by the base station of a random access request from a UE, and to make a determination that the received random access request is of a particular type, the particular type indicating that the UE that sent the random access request will seek to initiate a packet-based real time media session.

In addition, the controller is configured to determine, based on the determination of whether the received random access request is of the particular type, an extent of air interface resources to allocate to the UE for initial uplink transmission from the UE. In line with the discussion above, if the determination is that the random access request is of the particular type, then, based on the determination, the determined extent would be a first extent sufficient to carry from the UE both an RRC connection request and a session-initiation request for the packet-based real-time media session. But if the determination is that the random access request is not of the particular type, then the determined extent would be a lesser, second extent sufficient to carry the RRC connection request but not also the session-initiation request. And the controller is then further configured to output for transmission via the wireless communication interface, in response to the random access request, a random access response that provides the UE with an initial uplink grant of the determined extent of air interface resources.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described herein in the context of an LTE network. It should be understood, however, that the disclosed principles can extend to apply in various other contexts as well, such in connection with other types of networks. Further, numerous variations from the specifics described may be possible. For instance, elements and steps could be added, removed, combined, distributed, reordered, replicated, or otherwise modified. Further, it will be understood that various operations described herein as being carried out by one or more entities could be so carried out by or on behalf of the one or more entities, and by hardware, firmware, and/or software (such as by one or more processing units programmed with instructions executable to carry out the operations).

Figure 1:
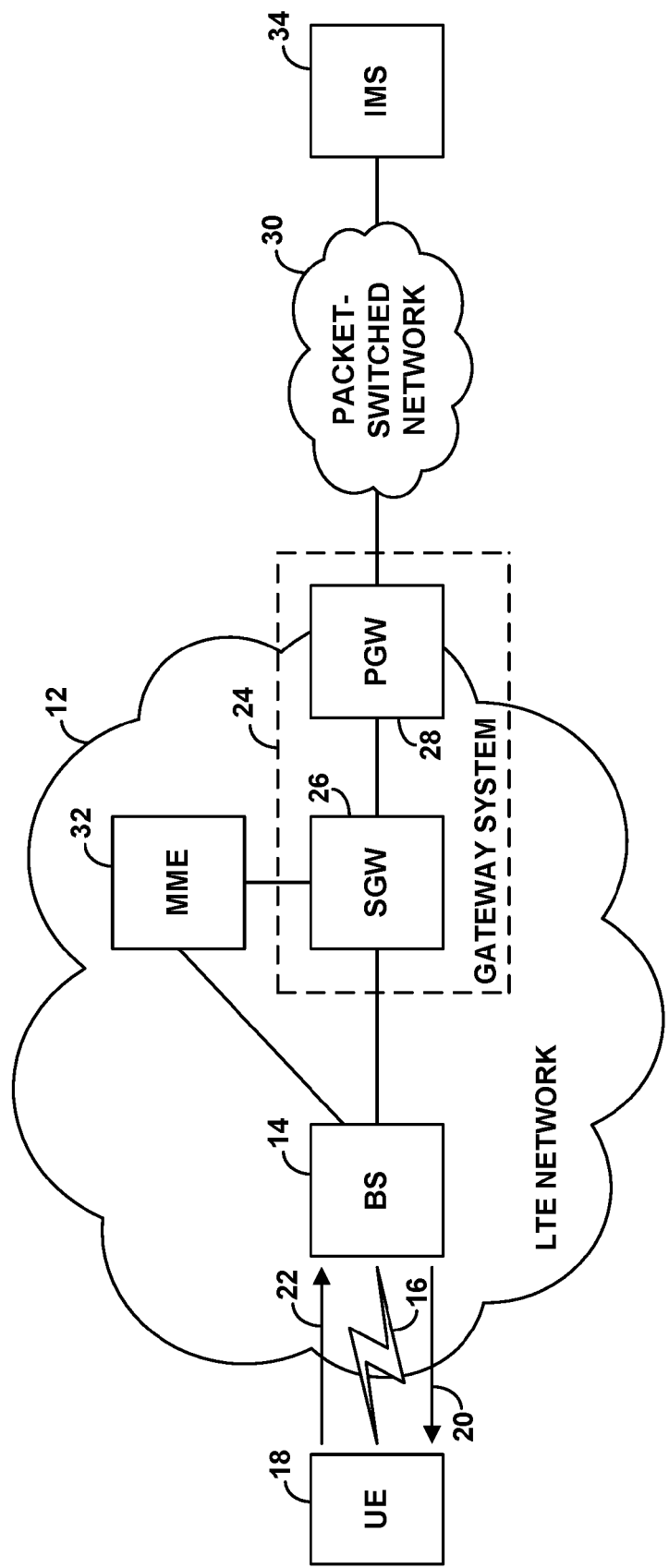
FIG. 1 is a simplified block diagram of an example system in which features of the present disclosure can be implemented.

Referring to the drawings, as noted above, FIG. 1 is a simplified block diagram of an example system in which aspects of the present disclosure can be implemented. As shown in the figure, the example system includes at its core a representative LTE network 12 that includes a representative LTE base station (evolved Node B (eNodeB)) 14 radiating to provide a coverage area 16 in which UEs, such as a representative UE 18, can be served by the base station over an air interface defining a downlink 20 and an uplink 22. In practice, the base station may generally take various forms, such as macro base station typically having a tower-mounted antenna and strong power amplifier to provide a wide range of coverage, a relay base station that functions as a base station but has a typically wireless backhaul link with another base station, or a small cell base station (e.g., picocell, femtocell, or the like) with a smaller form factor that typically provides a smaller range of coverage.

As further, shown, base station 14 then has a communication interface with a gateway system 24 that includes, by way of example, a serving gateway (SGW) 26 having an interface with a packet data network gateway (PGW) 28, and the gateway system in turn provides connectivity with a packet-switched network 30 such as the Internet or a private network. In addition, the base station is also shown having a communication interface with a mobility management entity (MME) 32, which also has a communication interface with the SGW 26. In practice, these various entities may sit as nodes on a wireless service provider's core packet network, and the interfaces between the entities may be logical connections over that packet network.

In addition, shown sitting on or accessible via the packet-switched network 30 is an Internet Multimedia Subsystem (IMS) 34. IMS 34 may include various proxy servers and application servers, such as a media server, and may function to provide packet-based real-time media communication services such as VoIP calling service.

In operation, for instance, the IMS may be configured to engage in SIP signaling or the like to establish packet-based real-time media sessions with call participants, and may be configured to bridge those sessions together so as to enable the call participants to communicate with each other. By way of example, when a calling party A seeks to initiate a call to a called party B, part A may generate and send a SIP INVITE message to the IMS, and the IMS may responsively generate and send a SIP INVITE message to party B. Upon receipt of a SIP 200 OK message from party B, the IMS may then generate and send a SIP 200 OK message to party A. Party A may then generate and send a SIP ACK message to the IMS, completing setup of a packet-based real-time media session (e.g., an RTP session) between party A and the IMS. And the IMS may then generate and send a SIP ACK message to party B, completing setup of a packet-based real-time media session between the IMS and party B. And the IMS may then bridge those two sessions together to enable parties A and B to communicate with each other.

In accordance with a recent version of LTE, the air interface provided by base station 14 operates on carrier frequency defining an extent of frequency bandwidth, including possibly separate frequency channels for the downlink and uplink (in a frequency division duplex (FDD) arrangement) or a common frequency channel shared over time between downlink and uplink (in a time division duplex (TDD) arrangement). Further, the air interface is divided over time into a continuum of 10-millisecond frames each divided into ten 1-millisecond subframes or transmission time intervals (TTIs), and then further divided into 0.5 millisecond slots. And in every subframe, the frequency bandwidth is divided into physical resource blocks (PRBs) or other air interface resources.

On the downlink and uplink, the LTE air interface further defines some particular channels with special purposes in line with the discussion above. For instance, on the downlink, the air interface defines a physical downlink control channel (PDCCH) for carrying scheduling directives and the like from the base station to UEs, and a physical downlink shared channel (PDSCH) for carrying scheduled downlink data transmissions to UEs. And on the uplink, the air interface defines a physical random access channel (PRACH) for carrying random access requests from UEs, and a physical uplink shared channel (PUSCH) for carrying scheduled uplink data transmissions from served UEs.

In a representative implementation, the PRACH may be defined as various PRACH instances in certain subframes per frame and in certain resource blocks in those subframes. Further, multiple such PRACH instances could be defined per frame and perhaps even per subframe. In practice, the base station may broadcast an overhead message that informs UEs where (e.g., in which resource blocks, at which times) the PRACH is defined, so that a UE seeking to gain access can transmit a random access request to the base station in any such PRACH instance and the base station can receive a random access request transmitted by a UE in any such PRACH instance.

In LTE, to send a random access request to a base station, a UE randomly selects a preamble from a set of 64 possible preambles, which are separate access codes, and the UE transmits the selected preamble in one of the defined PRACH instances to the base station. Such a PRACH transmission does not identify the UE, since it is merely a randomly selected preamble. But upon receipt of the preamble transmission, the base station becomes aware that a UE is trying to gain access. (In practice, LTE defines a contention-resolution process to handle the possibility of two UEs transmitting the same preamble in the same PRACH instance.)

Upon receipt of such a random access request, the base station then transmits a random access response message for receipt by whichever UE transmitted the random access request. For instance, the base station may transmit a PDCCH control message masked with a special RA-RNTI code, which points to particular PDSCH resources, and the base station may transmit the random access response on those particular PDSCH resources. In practice, the random access response message specifies a random access preamble identifier (to correlate with the random access preamble that the UE transmitted), timing advance information (to help compensate for transmission delay due to the distance between the UE and the base station), a temporary UE radio network identifier (T-CRNTI) (for use until the base station determines which UE sent the request).

Further, the random access response provides the UE with an initial grant of uplink resources on which the UE can then transmit an RRC connection request (i.e., a radio-link-layer connection request). For instance, the random access response may specify particular upcoming uplink PRBs on which the UE can transmit the RRC connection request. In practice, the RRC connection request may be on the order of 69 bytes long, and the UE may send it using quadrature phase shift keying (QPSK) modulation. If each PRB can carry 21 bytes with QPSK, the initial uplink grant for transmitting such an RRC connection may be on the order of about 4 PRBs.

Upon receipt of the random access response, the UE thus generates and transmits the RRC connection request to the base station on the specified uplink resources. And in the RRC connection request, the UE provides the base station with the T-CRNTI that the base station assigned, as well as an actual identity of the UE, such as an IMSI or the like. The base station may then transmit a response to the UE, providing the UE with a more permanent C-RNTI for the now-established RRC connection. And the base station and UE may make a record of the existence of the RRC connection (as a radio-link-layer connection).

In a representative implementation, provided with the RRC connection, the UE then transmits an attach request to the base station, and the base station forwards the attach request to the MME. The MME then initiates a process of authenticating the UE, and engages in signaling with the base station and SGW to establish for the UE an S1-U bearer tunnel for carrying bearer traffic between the base station and the SGW. Further, the SGW and PGW likewise engage in signaling with each other to establish for the UE an S5 bearer tunnel for carrying bearer traffic between the SGW and PGW, and the PGW assigns to the UE an IP address, which gets conveyed in an attach accept message or the like to the UE.

As additionally noted above, when there no bearer data has flowed to or from the UE for a threshold time period, the network may release the UE's RRC connection. In particular, the base station may responsively release the UE's RRC connection (and the base station may inform the UE, or the UE may determine that the time expired as well and may consider the RRC connection to be released). Further, the MME may tear down the UE's S1-U bearer tunnel, though the network may maintain the UE's S5 bearer tunnel (so that data destined to the UE could reach the SGW and thereby trigger paging of the idle UE).

In this idle mode, as noted above, if the UE seeks to transmit data, the UE would the engage in an access and RRC connection process like that described above so as to acquire an RRC connection (to transition from an RRC IDLE mode to an RRC CONNECTED mode), and the network may then autonomously or upon UE request newly establish an S1-U bearer for the UE to facilitate transmission of data to or from the UE. In turn, once the UE has re-acquired an RRC connection, the UE may then send to the base station a scheduling request for transmission of the data, the base station may allocate uplink shared channel resources for the transmission, and the UE may transmit the data on those resources to the base station. Upon receipt of the data, the base station may then forward the data via the UE's S1-U tunnel to the SGW, the SGW may forward the data via the UE's S5 tunnel to the PGW, and the PGW may output the data on the Internet or other packet-switched network for transmission to its destination.

As noted above, a problem with this arrangement may exist in a situation where the UE is idle and seeks to initiate a packet-based real-time media session such as a VoIP call (e.g., upon dialing of such a call by a user of the UE). In that situation, the UE would need to go through the above access and RRC connection process as well as the process of requesting uplink resource allocation and receiving the uplink resource allocation, before then sending a session initiation request, such as a SIP INVITE to the IMS or other destination, for the packet-based real-time media session.

To help avoid this problem and expedite initiation of such a packet-based real-time media session, the UE and base station may apply a special PRACH process that results in the base station assigning extra resources in the initial uplink grant, sufficient to enable the UE to transmit not only the RRC connection request but also the session initiation request for the packet-based real-time media session. Advantageously, the UE may thus transmit a SIP INVITE or the like as part of the access and connection process, rather than waiting until the RRC connection is established before transmitting the SIP INVITE. Further, as noted above, the base station may then store the UE's SIP INVITE until an S1-U tunnel is established for the UE, and upon establishment of that tunnel may then forward the SIP INVITE to its destination.

The special PRACH process involves the UE transmitting a random access request of a particular type that is indicative of the UE's plan to initiate a packet-based real-time media session, and thus the UE doing so in response to the UE seeking to initiate such a session (e.g., when application-layer program logic on the UE receives a user request to initiate such a session). By way of example, the particular type could be a reserved access preamble code or portion (e.g., bit) within the access preamble. Alternatively or additionally, the particular type could be a particular set of which the access preamble is a member, such as with one set of preambles being reserved as those of the particular type, and with another (mutually exclusive) set of preambles not being so reserved. And still alternatively or additionally, the particular type could be a particular PRACH instance, such as with one or more specific PRACH instances per frame being reserved for transmitting access requests that would be deemed to be of the particular type, and with one or more other PRACH instances per frame not being so reserved.

In practice, the UE and base station would both be configured with program logic or the like to use any of these or other distinctions of random access request type as a basis to indicate that the base station should provide an initial uplink grant sufficient to carry both the UE's RRC connection request and the UE's SIP INVITE or the like, rather than providing an initial uplink grant that is sufficient to carry the UE's RRC connection request but not also the UE's SIP INVITTE or the like. Thus, the UE may provide a random access request of the particular type to indicate this, and the base station may determine that the random access request is of the particular type and respond accordingly.

As noted above, the size of a typical RRC connection request is on the order of 69 bytes and thus about 4 PRBs using QPSK. Thus, if the UE is ordinarily seeking to access and connect with the base station, not with a planned packet-based real-time media session, then the UE may send an ordinary access request that is not of the particular type, and the base station may responsively provide the UE with an initial uplink grant of on the order of 4 PRBs, sufficient for the UE to send an RRC connection request but not also a SIP INVITE.

A typical SIP INVITE message, however, may be on the order of 128 bytes long. Therefore a transmission of both an RRC connection request and a SIP INVITE may be about 197 bytes, which would be about 10 PRBs using QPSK. Thus, the resources of an initial uplink grant of about 4 PRBs as noted above would be insufficient to carry both an RRC connection request and a SIP INVITE. But if the UE is seeking to access and connect with the base station when the UE plans to initiate a packet-based real-time media session, then the UE may send an access request of the particular type, and the base station may responsively provide the UE with an initial uplink grant of on the order of 10 PRBs, sufficient for the UE to transmit both an RRC connection request and a SIP INVITE.

In practice, the UE at issue in this process may be in the RRC IDLE mode and may thus have an assigned IP address, thought the UE would lack a radio-link-layer connection and may also lack an S1-U tunnel. The UE may thus specify its IP address in the SIP INVITE that the UE sends together with an RRC connection request.

Further, as noted above, when the base station receives the UE's RRC connection request and SIP INVITE (or other such session initiation request for the planned packet-based real-time media session), the base station may (i) store the SIP INVITE, pending setup of an S1-U tunnel for the UE, and, once the S1-U tunnel is established, then forward the SIP INVITE over the S1-U tunnel for transmission to its destination, such as to the IMS, and (ii) respond to the RRC connection request as noted above.

Figure 2:
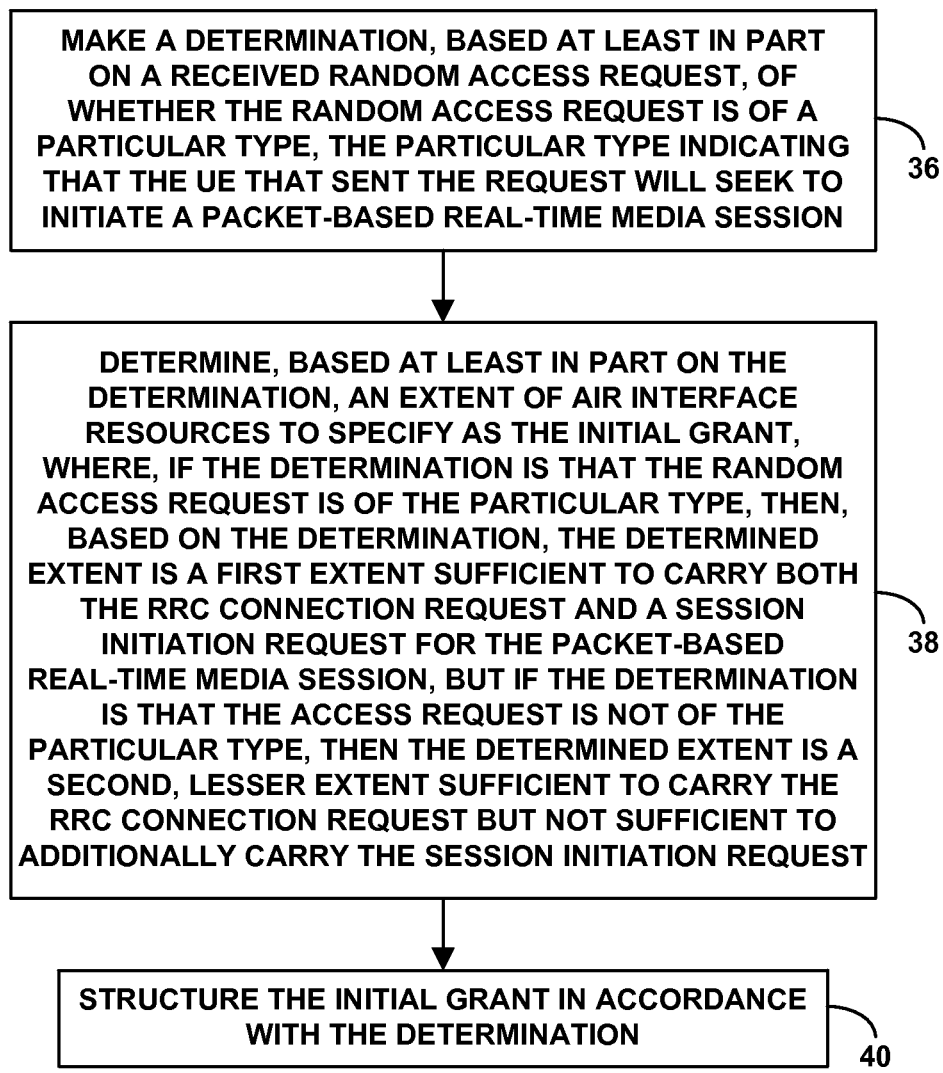
FIG. 2 is a flow chart depicting operations that can be carried out in accordance with the present disclosure.

FIG. 2 is next a flow chart depicting example operations that a base station could carry out in according with this disclosure. The base station in this example is configured to engage in an access process in response to the base station wirelessly receiving a random access request from a UE without an identification of the UE, where the access process includes the base station transmitting, for receipt by the UE that sent the access request, an access response that provides the UE with an initial grant of air interface resources for carrying a radio resource control (RRC) connection request from the UE to the base station.

As shown in FIG. 2, at block 36, the base station makes a determination, based at least in part on the received random access request, of whether the random access request is of a particular type, the particular type indicating that the UE will seek to initiate a packet-based real-time media session. (In practice, this operation may involve the base station determining that the access request is of the particular type and may further involve the base station determining that the particular type indicates that the UE will seek to initiate a packet-based real-time media session).

In turn, at block 38, the base station then determines, based at least in part on the determination (of whether the access request is of the particular type), an extent of air interface resources (e.g., a particular non-zero quantity of PRBs) to specify as the initial grant, where, if the determination is that the random access request is of the particular type, then, based on the determination, the determined extent is a first extent sufficient to carry both the RRC connection request and a session initiation request for the packet-based real-time media session, but if the determination is that the access request is not of the particular type, then the determined extent is a second, lesser extent sufficient to carry the RRC connection request but not sufficient to additionally carry the session initiation request. And at block 40, the base station then structures the initial grant in accordance with the determination, such as by providing a downlink control signal that specifies resources of the determined extent.

In line with the discussion above, the base station may then further receive a transmission from the UE on air interface resources specified by the initial grant. And if the determined extent is the first extent, then the transmission may comprise the RRC connection request and the session initiation request and the base station may then (i) store the received session initiation request until a bearer tunnel (e.g., S1-U) for carrying the session initiation request is established for the UE from the base station to the gateway system, and (ii) upon establishment of the bearer tunnel, transmit the session initiation request via the bearer tunnel to facilitate initiation of the packet-based real-time media session. Whereas, if the determined extent is the second extent, then the transmission may comprise the RRC connection request but not the session initiation request. Further, the base station may send to the UE a response to the RRC connection request.

Further, as discussed above, the random access request could comprise a random access preamble that is a member of a set of random access preambles, and the set could be indicative of whether the UE will seek to initiate a packet-based real-time media session, in which case making the determination of whether the random access request is of the particular type could involve making the determination based on the set of random access preambles of which the random access preamble is a member. Alternatively or additionally, the random access request could comprises a random access preamble having a particular value, in which case making the determination of whether the random access request is of the particular type could involve making the determination based on the particular value. And still alternatively or additionally, an uplink between the UE and the base station could define multiple random access channel instances for carrying random access requests, in which case making the determination of whether the random access request is of the particular type could involve making the determination based on which of the random access channel instances carried the random access request.

Figure 3:
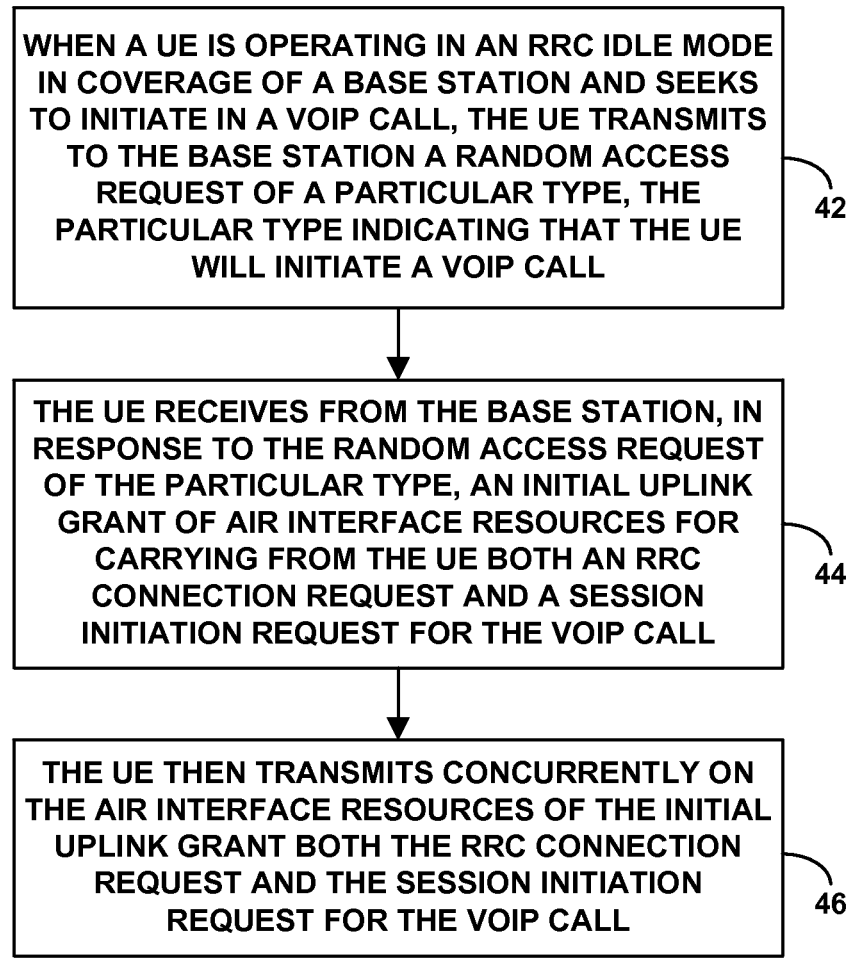
FIG. 3 is another flow chart depicting operations that can be carried out in accordance with the present disclosure.

FIG. 3 is next a flow chart depicting example operations that a UE could carry out in according with this disclosure. As shown in FIG. 3, at block 42, when the UE is operating in an RRC IDLE mode in coverage of a base station and seeks to initiate in a VoIP call, the UE transmits to the base station a random access request of a particular type, the particular type indicating that the UE will initiate a VoIP call. In turn, at block 44, the UE receives from the base station, in response to the random access request of the particular type, an initial uplink grant of air interface resources for carrying from the UE both an RRC connection request and a session initiation request for the VoIP call. And at block 46, the UE then transmits concurrently on the air interface resources of the initial uplink grant both the RRC connection request and the session initiation request for the VoIP call (e.g., by transmitting both the RRC connection request and the session initiation request in the same subframe or the like).

Features described above may apply here as well. For instance, the particular type could be (i) a random access preamble being in a set that is indicative of a plan to initiate a VoIP call, (ii) a random access preamble being of a value that is indicative of a plan to initiate a VoIP call, and/or (iii) a random access request transmitted in a particular random access channel instance that is indicative of a plan to initiate a VoIP call. Further, the random access request might not identify the UE.

Figure 4:
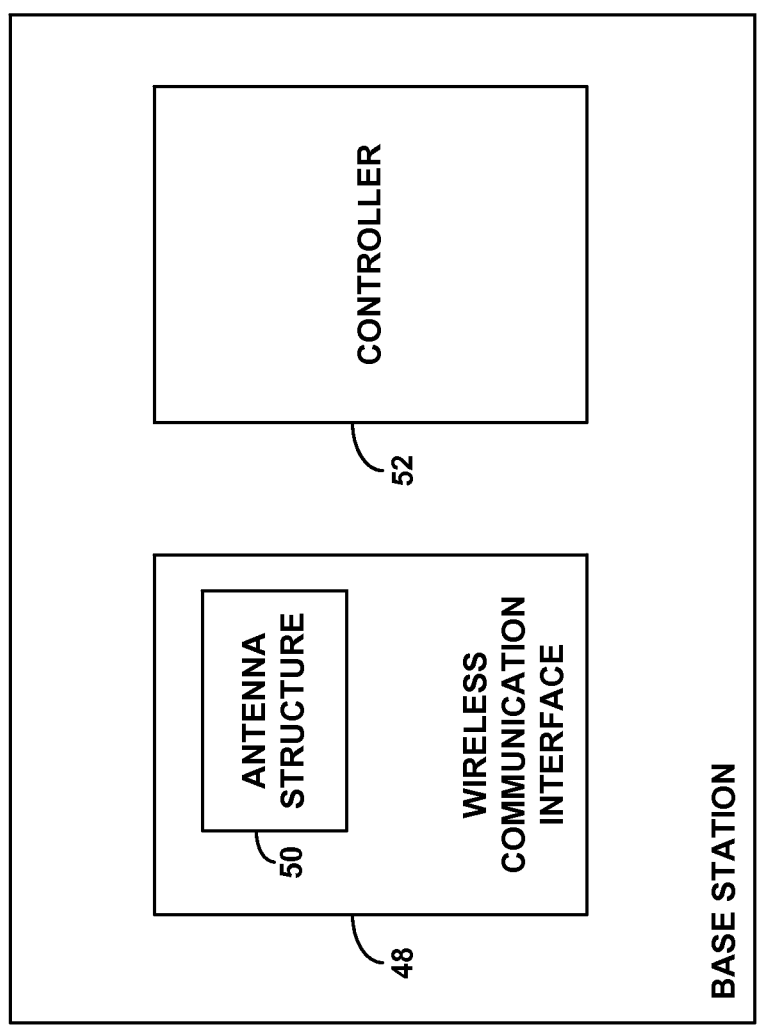
FIG. 4 is a simplified block diagram of a base station operable in accordance with the present disclosure.

Finally, FIG. 4 is next a simplified block diagram of a base station depicting example components that could be involved in implementing base station operations described herein. As shown, the base station includes a wireless communication interface 48 having an antenna structure (e.g., any base station antenna structure) 50 for wirelessly transmitting and receiving over an air interface, the air interface defining a random access channel for carrying random access messages wirelessly from UEs to the base station. Further, the base station includes a controller (e.g., one or more programmed processing units or the like) 52, which may be integrated with the wireless communication interface (such as by being provided as a processing unit on a wireless communication chipset or the like) configured (e.g., programmed) to carry out various base station operations.

In an example arrangement, the controller is configured to detect receipt by the base station of a random access request from a UE. Further, the controller is configured to make a determination that the received random access request is of a particular type, the particular type indicating that the UE that sent the random access request will seek to initiate a packet-based real time media session. Still further, the controller is configured to determine, based on the determination of whether the received random access request is of the particular type, an extent of air interface resources to allocate to the UE for initial uplink transmission from the UE, in line with the discussion above. And the controller is configured to outputting for transmission via the wireless communication interface, in response to the random access request, a random access response that provides the UE with an initial uplink grant of the determined extent of air interface resources.

Here again, various features described above may apply here as well. For instance, the random access request might not identify the UE. Further, if the determined extent is the first extent, then the base station could receive from the UE on the allocated resources the RRC connection request and the session initiation request, the controller could cause the base station to store the received session initiation request until a bearer tunnel (e.g., S1-U) for carrying the session initiation request is established for the UE from the base station to the gateway system, and, upon establishment of the bearer tunnel, the controller could cause the base station to transmit the session initiation request via the bearer tunnel to facilitate initiation of the packet-based real-time media session. Whereas, if the determined extent is the second extent, then the base station may from the UE on the allocated resources the RRC connection request but not the session initiation request. Further, the particular type could be one or more of those noted above.

Exemplary embodiments have been described above. It should be understood, however, that variations from these embodiments are possible, while remaining within the scope of the invention.

We claim:

1. A method operable by a base station, wherein the base station is configured to engage in an access process in response to the base station wirelessly receiving a random access request from a user equipment device (UE) without an identification of the UE, wherein the access process includes the base station transmitting, for receipt by the UE that sent the access request, an access response that provides the UE with an initial grant of air interface resources for carrying a radio resource control (RRC) connection request from the UE to the base station, the method comprising:
  making a determination by the base station, based at least in part on the received random access request, of whether the random access request is of a particular type, wherein the particular type indicates the UE will seek to initiate a packet-based real-time media session;
  determining by the base station, based at least in part on the determination, an extent of air interface resources to specify as the initial grant, wherein, if the determination is that the random access request is of the particular type, then, based on the determination, the determined extent is a first extent sufficient to carry both the RRC connection request and a session initiation request for the packet-based real-time media session, but if the determination is that the access request is not of the particular type, then the determined extent is a second, lesser extent sufficient to carry the RRC connection request but not sufficient to additionally carry the session initiation request; and
  structuring by the base station the initial grant in accordance with the determination.

2. The method of claim 1, further comprising receiving by the base station a transmission from the UE on air interface resources specified by the initial grant,
  wherein if the determined extent is the first extent, then the transmission comprises the RRC connection request and the session initiation request and the method then further comprises (i) storing by the base station the received session initiation request until a bearer tunnel for carrying the session initiation request is established for the UE from the base station to a gateway system, and (ii) upon establishment of the bearer tunnel, transmitting by the base station the session initiation request via the bearer tunnel to facilitate initiation of the packet-based real-time media session,
  wherein if the determined extent is the second extent, then the transmission comprises the RRC connection request but not the session initiation request, and
  wherein the method also comprises the base station sending to the UE a response to the RRC connection request.

3. The method of claim 2, wherein the bearer tunnel comprises an S1-U tunnel.

4. The method of claim 1, wherein the random access request comprises a random access preamble that is a member of a set of random access preambles, the set being indicative of whether the UE will seek to initiate a packet-based real-time media session, and wherein making the determination of whether the random access request is of the particular type comprises making the determination based on the set of random access preambles of which the random access preamble is a member.

5. The method of claim 1, wherein the random access request comprises a random access preamble having a particular value, and wherein making the determination of whether the random access request is of the particular type comprises making the determination based on the particular value.

6. The method of claim 1, wherein an uplink between the UE and the base station defines multiple random access channel instances for carrying random access requests, and wherein making the determination of whether the random access request is of the particular type comprises making the determination based on which of the random access channel instances carried the random access request.

7. The method of claim 1, wherein the packet-based real-time media session comprises a voice over Internet Protocol (VoIP) session, and wherein the session initiation request comprises a Session Initiation Protocol INVITE message.

8. The method of claim 1, wherein an uplink between the UE and the base station defines a shared traffic channel having a plurality of physical resource blocks, and wherein the determined extent of air interface resources comprises a non-zero quantity of the physical resource blocks.

9. A method operable by a user equipment device (UE), the method comprising:
  when the UE is operating in a radio resource control (RRC) IDLE mode in coverage of a base station and seeks to initiate in a voice over Internet Protocol (VoIP) call, transmitting by the UE to the base station a random access request of a particular type, the particular type indicating that the UE will initiate a VoIP call;
  receiving by the UE from the base station, in response to the random access request of the particular type, an initial uplink grant of air interface resources for carrying from the UE both an RRC connection request and a session initiation request for the VoIP call; and
  transmitting by the UE concurrently on the air interface resources of the initial uplink grant both the RRC connection request and the session initiation request for the VoIP call.

10. The method of claim 9, wherein the particular type comprises a type selected from the group consisting of (i) a random access preamble being in a set that is indicative of a plan to initiate a VoIP call, (ii) a random access preamble being of a value that is indicative of a plan to initiate a VoIP call, and (iii) a random access request transmitted in a particular random access channel instance that is indicative of a plan to initiate a VoIP call.

11. The method of claim 9, wherein the random access request does not identify the UE.

12. A base station comprising:
  a wireless communication interface having an antenna structure for wirelessly transmitting and receiving over an air interface, wherein the air interface defines a random access channel for carrying random access messages wirelessly from user equipment devices (UEs) to the base station; and
  a controller, wherein the controller is configured to carry out operations including:
  (a) detecting receipt by the base station of a random access request from a UE,
  (b) making a determination that the received random access request is of a particular type, wherein the particular type indicates that the UE that sent the random access request will seek to initiate a packet-based real time media session,
  (c) determining, based on the determination of whether the received random access request is of the particular type, an extent of air interface resources to allocate to the UE for initial uplink transmission from the UE, wherein, if the determination is that the random access request is of the particular type, then, based on the determination, the determined extent is a first extent sufficient to carry from the UE both a radio resource control (RRC) connection request and a session-initiation request for the packet-based real-time media session, but if the determination is that the random access request is not of the particular type, then the determined extent is a lesser, second extent sufficient to carry the RRC connection request but not also the session-initiation request, and (d) outputting for transmission via the wireless communication interface, in response to the random access request, a random access response that provides the UE with an initial uplink grant of the determined extent of air interface resources.

13. The base station of claim 12, wherein the random access request does not identify the UE.

14. The base station of claim 12, wherein, if the determined extent is the first extent, then the base station receives from the UE on the allocated resources the RRC connection request and the session initiation request and the operations further include (i) causing the base station to store the received session initiation request until a bearer tunnel for carrying the session initiation request is established for the UE from the base station to the gateway system, and (ii) upon establishment of the bearer tunnel, causing the base station to transmit the session initiation request via the bearer tunnel to facilitate initiation of the packet-based real-time media session, and wherein if the determined extent is the second extent, then the base station receives from the UE on the allocated resources the RRC connection request but not the session initiation request.

15. The base station of claim 14, wherein the bearer tunnel comprises an S1-U tunnel.

16. The base station of claim 12, wherein the random access request comprises a random access preamble that is a member of a set of random access preambles, the set being indicative of whether the UE will seek to initiate a packet-based real-time media session, and wherein making the determination of whether the random access request is of the particular type comprises making the determination based on the set of random access preambles of which the random access preamble is a member.

17. The base station of claim 12, wherein the random access request comprises a random access preamble having a particular value, and wherein making the determination of whether the random access request is of the particular type comprises making the determination based on the particular value.

18. The base station of claim 12, wherein an uplink between the UE and the base station defines multiple random access channel instances for carrying random access requests, and wherein making the determination of whether the random access request is of the particular type comprises making the determination based on which of the random access channel instances carried the random access request.

19. The base station of claim 12, wherein the packet-based real-time media session comprises a voice over Internet Protocol (VoIP) session, and the session initiation request comprises a Session Initiation Protocol INVITE message.

20. The base station of claim 12, wherein an uplink between the UE and the base station defines a shared traffic channel having a plurality of physical resource blocks, and wherein the determined extent of air interface resources comprises a non-zero quantity of the physical resource blocks.

* * * * *